US009989203B2

(12) United States Patent
Hoehmann

(10) Patent No.: US 9,989,203 B2
(45) Date of Patent: Jun. 5, 2018

(54) LIGHTING DEVICE COMPRISING PHOSPHOR ARRANGEMENT AND LASER

(71) Applicant: OSRAM GMBH, Munich (DE)

(72) Inventor: Peter Hoehmann, Berlin (DE)

(73) Assignee: OSRAM GmbH, Munich (DE)

( * ) Notice: Subject to any disclaimer, the term of this patent is extended or adjusted under 35 U.S.C. 154(b) by 0 days. days.

(21) Appl. No.: 15/417,982

(22) Filed: Jan. 27, 2017

(65) Prior Publication Data

US 2017/0205033 A1 Jul. 20, 2017

Related U.S. Application Data

(62) Division of application No. 14/412,942, filed as application No. PCT/EP2013/064306 on Jul. 5, 2013.

(30) Foreign Application Priority Data

Jul. 6, 2012 (DE) .......................... 10 2012 211 837

(51) Int. Cl.
*F21V 9/16* (2006.01)
*F21K 9/64* (2016.01)
(Continued)

(52) U.S. Cl.
CPC ................... *F21K 9/64* (2016.08); *F21V 5/04* (2013.01); *F21V 7/0091* (2013.01); *F21V 9/08* (2013.01); *F21V 9/30* (2018.02); *F21V 14/08* (2013.01); *G02B 26/008* (2013.01); *G03B 21/204* (2013.01); *F21Y 2113/13* (2016.08); *F21Y 2115/30* (2016.08)

(58) Field of Classification Search
CPC ........ F21K 9/64; G02B 26/008; G03B 21/204

USPC ............................................................ 362/84
See application file for complete search history.

(56) References Cited

U.S. PATENT DOCUMENTS 6,357,889 B1 3/2002 Duggal et al.
9,816,683 B2 * 11/2017 Hu ............................ F21V 7/22
(Continued)

FOREIGN PATENT DOCUMENTS

DE 10 2010 062 465 6/2012
DE 10 2011 003 665 8/2012
(Continued)

OTHER PUBLICATIONS

Office Action dated Mar. 7, 2017 which issued in the corresponding Japanese Patent Application No. 2015-519239.

*Primary Examiner* — William N Harris
(74) *Attorney, Agent, or Firm* — Cozen O'Connor

(57) ABSTRACT

A lighting device comprising a phosphor arrangement (2) having a phosphor region (31-33), a first laser (5) for irradiating a part of the phosphor region (31-33) with a first laser radiation. The phosphor region (31-33) has at least one phosphor which can be irradiated by the first laser radiation and re-emits the first laser radiation at least partly in a manner wavelength-converted into colored light having a first light color. A second laser (6) is configured for emitting a second laser radiation having a second light color. The second light color of the second laser radiation is identical in color to the first light color of the wavelength-converted colored light. The lighting device is configured to simultaneously emit the second laser radiation and the wavelength-converted colored light of identical color emitted by the phosphor.

10 Claims, 6 Drawing Sheets

(51) Int. Cl.

| | | |
|---|---|---|
| *F21V 14/08* | (2006.01) | |
| *F21V 9/08* | (2018.01) | |
| *F21V 7/00* | (2006.01) | |
| *G02B 26/00* | (2006.01) | |
| *G03B 21/20* | (2006.01) | |
| *F21Y 115/30* | (2016.01) | |
| *F21Y 113/13* | (2016.01) | |
| *F21V 9/30* | (2018.01) | |
| *F21V 5/04* | (2006.01) | |

(56) References Cited

U.S. PATENT DOCUMENTS

| | | | |
|---|---|---|---|
| 2002/0186349 A1 | 12/2002 | Wichner et al. | |
| 2009/0021700 A1* | 1/2009 | Matsumoto | G03B 21/2033 |
| | | | 353/38 |
| 2009/0284148 A1 | 11/2009 | Iwanaga | |
| 2010/0208486 A1 | 8/2010 | Gladnick | |
| 2011/0051102 A1* | 3/2011 | Ogura | G03B 21/204 |
| | | | 353/85 |
| 2011/0090465 A1* | 4/2011 | Watanabe | G03B 21/28 |
| | | | 353/31 |
| 2011/0157865 A1 | 6/2011 | Takahashi | |
| 2011/0242495 A1 | 10/2011 | Chen et al. | |
| 2011/0249436 A1 | 10/2011 | Li et al. | |
| 2012/0057364 A1 | 3/2012 | Kishimoto | |
| 2012/0062857 A1 | 3/2012 | Saitou et al. | |
| 2012/0195057 A1 | 8/2012 | Kishimoto | |
| 2012/0206900 A1 | 8/2012 | Yang | |
| 2013/0242273 A1 | 9/2013 | Weichmann | |
| 2013/0242534 A1 | 9/2013 | Pettitt | |
| 2013/0314896 A1 | 11/2013 | Finsterbusch | |
| 2013/0322056 A1 | 12/2013 | Konuma | |
| 2017/0242326 A1* | 8/2017 | Hu | G03B 21/204 |

FOREIGN PATENT DOCUMENTS

| | | |
|---|---|---|
| DE | 10 2011 004 563 | 8/2012 |
| DE | 10 2011 004 574 | 8/2012 |
| JP | 2004-341105 | 12/2004 |
| JP | 2005-250088 | 9/2005 |
| JP | 2008-216840 | 9/2008 |
| JP | 2009-025512 | 2/2009 |
| JP | 2011-090098 | 5/2011 |
| JP | 2011-128641 | 6/2011 |
| JP | 2011-170363 | 9/2011 |
| JP | 2012-128297 | 7/2012 |
| JP | 2012-128340 | 7/2012 |
| WO | WO 2009/112961 | 9/2009 |

* cited by examiner

LIGHTING DEVICE COMPRISING PHOSPHOR ARRANGEMENT AND LASER

CROSS-REFERENCE TO RELATED APPLICATIONS

This is a division of U.S. Ser. No. 14/412,942, filed on Jan. 5, 2015, which is a U.S. National Phase Application under 35 U.S.C. § 371 of International Application No. PCT/EP2013/064306, filed on Jul. 5, 2013, which claims the priority of German Application No. 10 2012 211 837.3, filed on Jul. 6, 2012, the entire content of which is hereby incorporated by reference.

TECHNICAL FIELD

The invention relates to a lighting device comprising at least one laser and a phosphor arrangement that is irradiated by the laser radiation of the at least one laser. Furthermore, the invention relates to a method for operating said lighting device.

The invention is applicable in particular to projection devices, for example for film and video projecting gear in industrial and medical image recognition, in technical and medical endoscopy, for lighting effects in the entertainment industry, for medical irradiations and in the automotive sector, in particular for headlights for motor vehicles.

BACKGROUND OF THE INVENTION

Light sources having a high luminous flux and a high luminance are employed in a wide variety of fields, for instance in endoscopy and likewise in projection apparatuses, wherein gas discharge lamps are currently the most widely used for this purpose. In lighting applications, for example projection or endoscopy, on the basis of LARP ("Laser Activated Remote Phosphor") technology, which is known in principle, a phosphor is excited by a laser arranged at a distance from said phosphor. In this case, the laser radiation that impinges on the phosphor is at least partly converted into wavelength-converted useful light by means of wavelength conversion by the phosphor.

The term laser radiation hereinafter encompasses both non-visible, e.g. ultraviolet (UV) or infrared (IR), laser radiation and visible, e.g. blue-violet, blue, red, etc., laser radiation. A suitable phosphor or a phosphor mixture converts the invisible or visible laser radiation into corresponding visible electromagnetic radiation, i.e. light. Hereinafter the term "color" phosphor, where "color" here is representative of a concrete color, for example one of the primary colors red, green, blue, yellow, etc., or a mixed color composed of two or more primary colors, characterizes a phosphor which, upon excitation with suitable laser radiation, converts the latter into light having the relevant "color", i.e. what is meant here is a light color, rather than a body color. A red phosphor thus converts suitable laser radiation, for example blue laser radiation of a blue laser diode having an emission wavelength of approximately 460 nm, into light having the light color "red" (red light), a green phosphor converts the laser radiation into light having the light color "green" (green light), etc. The invention is not restricted to the visible range for the superimposed light, although this is preferred from a present-day perspective for practically relevant applications. For video projecting, in particular, the corresponding phosphors for the projector color channels red, green and blue (possibly also further color channels, e.g. yellow) are usually applied to a rotating wheel in order to distribute the laser power over a larger area on average over time and thus to reduce the phosphor degradation. In addition, static phosphor arrangements are also known, in which the phosphors are applied on a heat sink. At all events the light wavelength-converted by a phosphor is collected by means of an optical device, e.g. reflector, converging lens or TIR optical element (TIR: Total Internal Reflection; e.g. conical glass rod), and used further for the relevant application.

What is disadvantageous is that red phosphors have a lower conversion efficiency in comparison with yellow and green phosphors if they are irradiated with laser radiation having high surface power densities (e.g. 10-50 $W/mm^2$). As a result, for red light, in particular, limits are imposed on the luminous fluxes and luminances that can be achieved with LARP technology.

SUMMARY OF THE INVENTION

One object of the present invention is to provide a lighting device on the basis of LARP technology having an improved luminous flux and high luminance for at least one light color.

This object is achieved in accordance with one aspect of the invention directed to a lighting device, comprising a phosphor arrangement having at least one phosphor region, at least one first laser for irradiating in each case at least one part of the phosphor region with a first laser radiation, wherein the at least one phosphor region comprises at least one phosphor which can be irradiated by the first laser radiation and re-emits said first laser radiation at least partly in a manner wavelength-converted into colored light having a first light color, at least one second laser designed for emitting a second laser radiation having a second light color, wherein the second light color of the second laser radiation is identical to the first light color of the wavelength-converted colored light, and wherein the lighting device is designed to simultaneously emit the second laser radiation and the wavelength-converted colored light of identical color emitted by the at least one phosphor.

Another aspect of the invention is directed to a method for operating a lighting device as described above, wherein the laser radiation of the at least one second laser is emitted at least occasionally simultaneously with the irradiation of the at least one phosphor with the laser radiation of the at least one first laser.

The at least one laser can comprise in particular at least one semiconductor laser, in particular diode laser or laser diode. Moreover, laser diodes can be operated together in groups in a simple manner, e.g. as a stack ("laser stack") or matrix.

The phosphor region can comprise, in particular, a phosphor layer comprising one or a plurality of phosphors. A phosphor layer of the phosphor region can be settable with regard to the thickness thereof and/or a concentration of the at least one phosphor in a targeted manner such that a wavelength-converted portion is thus also settable in a targeted manner. In particular, by means of a sufficiently high phosphor concentration and/or a sufficiently large thickness, the incident first laser radiation can be substantially completely wavelength-converted. This can correspond, in particular, to a degree of conversion of at least approximately 95%, in particular of at least approximately 98%, in particular of at least approximately 99%.

The wavelength conversion can be carried out for example on the basis of a luminescence, in particular photoluminescence or radioluminescence, in particular phosphorescence and/or fluorescence.

However, the phosphor region can also serve (only) as a diffuser for the incident second laser radiation. The spectrum of the second laser radiation scattered by the phosphor region diffusely and without phosphor conversion thus remains unchanged.

Besides the at least one first laser radiation, it is also possible to use one or a plurality of further laser radiations having mutually different laser spectra for exciting the at least one phosphor region, i.e. for the phosphor conversion into colored light having a light color. By way of example, it can be advantageous to irradiate a first phosphor (e.g. red phosphor) with a laser radiation having a first laser spectrum (e.g. blue laser radiation) and a second phosphor (e.g. blue phosphor) with a laser radiation having a second laser spectrum (e.g. blue-violet or ultraviolet laser radiation). Likewise, for the superimposition with unconverted laser radiation, it can be advantageous to provide, in addition to the at least one second laser radiation, one or a plurality of further laser radiations having mutually different laser spectra but in each case the same light color as the colored light converted by a phosphor.

Within the meaning of the present invention, the terms "the same light color" and "light of identical color" or the like should be understood such that the dominant wavelength of the second laser radiation differs from the dominant wavelength of the simultaneously superimposed wavelength-converted light (by means of phosphor conversion of the first laser radiation) in terms of absolute value not more than, with increasing preference in this order, by 20%, 15%, 10%, 5%. The dominant wavelength of light having a light color (colored light) is defined in the CIE chromaticity diagram (standard chromaticity diagram) by the point of intersection between the straight line, extended from the white point via the determined color locus of the colored light, and the spectrum locus of the closest edge of the CIE chromaticity diagram.

A concept applied by the invention consists, in the case of high luminances, in increasing the luminous flux of a colored light portion of the useful light of an LARP-based lighting device by the broadband colored light generated by means of phosphor conversion in a known manner and having a light color corresponding to the phosphor used being simultaneously superimposed with a narrowband laser radiation having the same light color. It is only as a result of the simultaneous superimposition of converted colored light with laser radiation having the same light color that a high luminous flux, required for projection applications, in particular, and also a high luminance are achieved for the respective light color. To express it in a simplified way, therefore, by way of example, the broadband red light generated by a red phosphor is simultaneously superimposed with narrowband red laser radiation, thus resulting in superimposed red light (R) having the lighting properties according to the invention. It can also be advantageous for the broadband red light generated by a red phosphor to be simultaneously superimposed with narrowband red laser radiation having two or more different laser emission wavelengths, for example having a laser emission wavelength of 638 nm and 670 nm. This concept is also suitable, in principle, for other light colors, e.g. green (G), yellow (Y) or blue (B). However, for the other light colors, with the currently available phosphors and laser diode wavelengths, this is not (yet) possible with the same efficiency as for red light.

By suitably mixing the colored light superimposed according to the invention with one or a plurality of further colored light portions, it is possible to set mixed light having a cumulative color locus appropriate for the respective application of the lighting device. As necessary, the further color portions can in turn likewise be generated by superimposition of broadband light having a light color from a phosphor conversion with laser radiation of identical color.

For projection applications, in particular, the individual color channels of an image generating unit require corresponding colored light portions, for example in the primary colors—spanning a color space (gamut)—red, yellow, green, blue, the dominant wavelengths of which lie within specific wavelength ranges.

The red channel of a video projector, for example, requires red light having a dominant wavelength in the range of approximately 600 to 620 nm. The inventor has found that the simultaneous superimposition of broadband red light—generated by a red phosphor excited with laser radiation—and narrowband red laser radiation—for example from a red laser diode having an emission wavelength of approximately 638 nm—is advantageously suitable for this purpose. It is only the simultaneous superimposition of the conversion light generated by means of LARP technology with laser radiation of identical color that makes it possible to achieve not only a high luminous flux but also a high luminance for the resulting colored light. Light emitting diodes (LEDs) are incidentally not suitable for the high luminances sought, on account of their high etendue. Some significant insights are summarized in the table further below, wherein the respective red phosphor RL was irradiated with a blue laser diode and a surface power density of 10 W/mm$^2$. The red laser diode LD had an emission wavelength of approximately 638 nm.

| No. | Power [W] RL | Power [W] LD | Luminous flux [lm] | Dominant wavelength [nm] |
|---|---|---|---|---|
| 1 | 1 (L0) | — | 210 | 600.2 |
| 2 | 1 (L1) | — | 270 | 596.2 |
| 3 | 0.75 (L0) | 0.25 | 190 | 604.7 |
| 4 | 0.75 (L1) | 0.25 | 235 | 600.3 |
| 5 | 1 (L1) | 0.33 | 315 | 600.3 |

As can be discerned from a comparison of rows 1 and 4, given the same optical power (1 W) and the same dominant wavelength (approximately 600 nm), but with an additional red laser diode LD (25% of the optical power), a luminous flux is achieved which is approximately 10% higher than without. In order to be able to keep the dominant wavelength constant, a standard phosphor L0 was used in the configuration in No. 1 without a red laser diode, and a correspondingly adapted phosphor L1 was used with a red laser diode. Alternatively, given the same phosphor L0 and in addition a red laser diode LD, it is possible to achieve a higher dominant wavelength (604.7 nm instead of 600.2 nm) (cf. rows 1 and 3).

Comparison of rows 1 and 5 reveals that, given the same dominant wavelength (approximately 600 nm), but with 33% additional optical power from a red laser diode LD, a luminous flux which is almost 50% higher is achieved. These results reveal the potential for increasing the luminous flux in the red color channel if, given correspondingly high surface power densities of the pump laser radiation on the red phosphor, the maximum conversion of the red phosphor has been reached, i.e. if increasing the pump laser power no longer enables a higher colored luminous flux solely by means of the corresponding phosphor conversion.

It is noteworthy in this connection that the colored light converted by means of a phosphor and the laser radiation of identical color are generated or superimposed simultaneously. It is only then that an increase in the luminous flux in the relevant color channel is possible.

For further details concerning the simultaneous generation and subsequent superimposition of broadband light from a phosphor conversion and laser radiation of identical color, reference should be made to the following exemplary embodiments. The configuration possibilities, features and their advantages described for the lighting device according to the invention hold true analogously, in so far as applicable, for the method according to the invention as well.

BRIEF DESCRIPTION OF THE DRAWINGS

The invention will be explained in greater detail below on the basis of exemplary embodiments. In the figures.

DETAILED DESCRIPTION OF THE DRAWINGS

Identical reference signs in different exemplary embodiments hereinafter denote features that are identical or of identical type.

Figure 1:
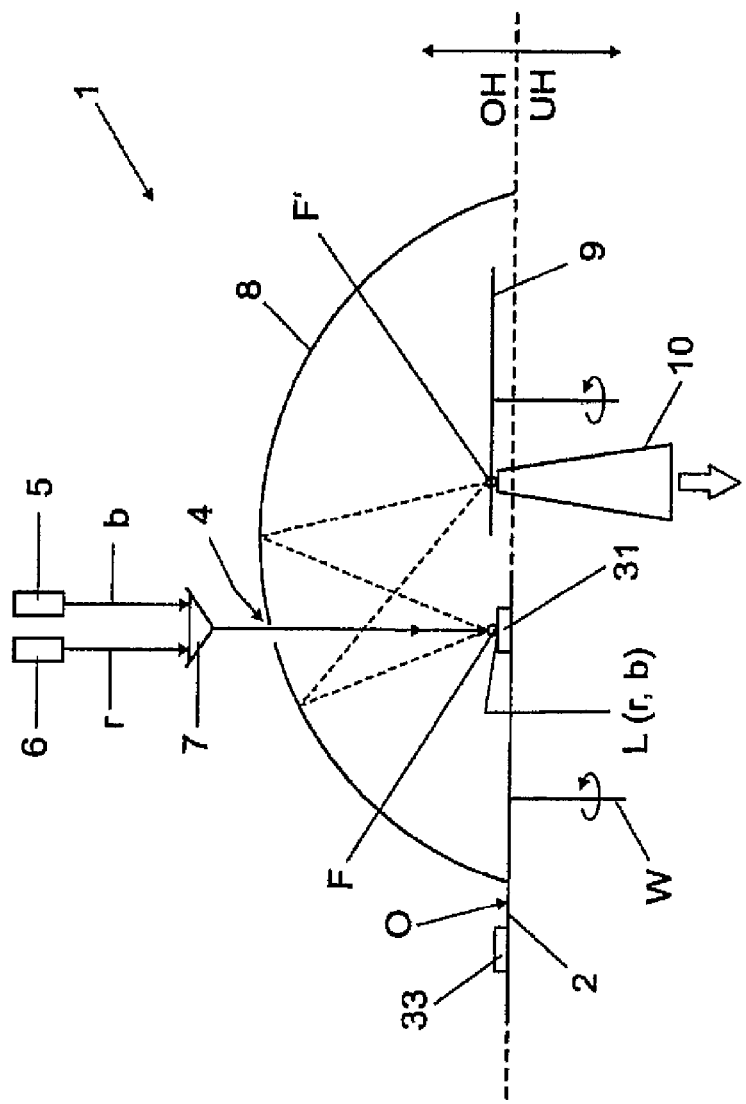
FIG. 1 shows a lighting device in accordance with a first embodiment comprising a rotatable phosphor wheel.
Figure 2:
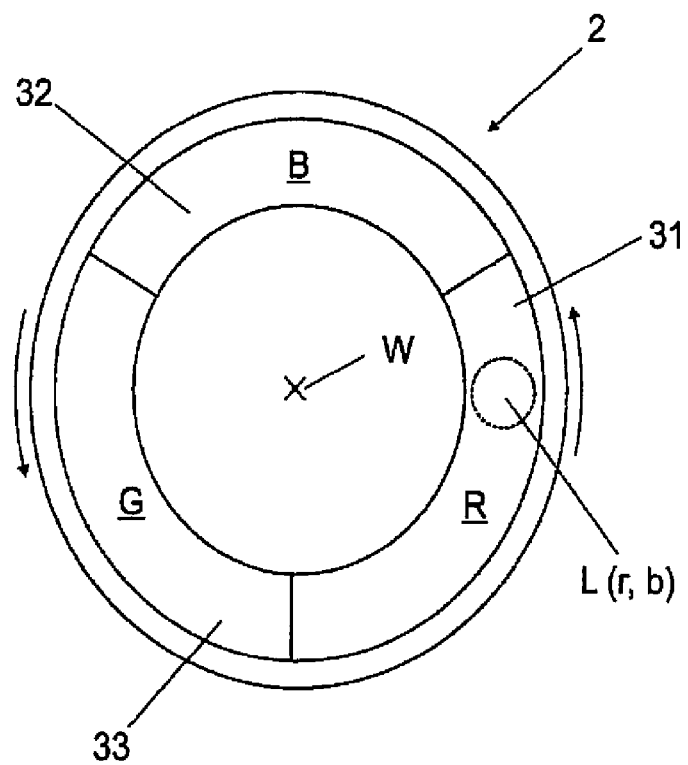
FIG. 2 shows in plan view one possible embodiment of the phosphor wheel of the lighting device from FIG. 1.

FIG. 1 shows, as a schematic sectional illustration in side view, a lighting device 1 comprising a phosphor wheel 2, which is rotatable about a rotation axis W, as indicated by the curved arrow. FIG. 2 shows in plan view one possible embodiment of the phosphor wheel 2. The lighting device 1 is suitable for example for application in a video projector with an image generating unit having the color channels red (r), green (g) and blue (b).

The phosphor wheel 2 comprises three luminous regions 31, 32 and 33 embodied as adjacent ring segments on a ring that is concentric with respect to the rotation axis W. The lighting device 1 furthermore comprises a first laser 5 for irradiating the three luminous regions 31 to 33 and also a second laser 6 for irradiating in each case only the luminous region 31 (R), which both irradiate a top side O of the phosphor wheel 2. The first laser 5 emits ultraviolet laser radiation or at least blue-violet laser radiation b, and the second laser 6 emits red laser radiation r. The respective laser radiation b, r of the two lasers 5, 6 is combined via an optical element 7 onto a shared irradiation zone on the top side O of the phosphor wheel 2 and forms there the laser radiation spot L—shared during the red phosphor segment R—, below which the phosphor wheel 2 rotates.

The luminous regions 31 to 33 are covered here with a first phosphor layer R, a second phosphor layer G and a third phosphor layer B, which convert the blue-violet laser radiation b of the first laser 5 with a high degree of conversion, e.g. of more than 95%, temporally successively into red (red phosphor), green (green phosphor) and respectively blue light (blue phosphor) by "down conversion". The red, green and respectively blue light is then scattered in each case into an upper half-space OH above the irradiated top side O of the phosphor wheel 2. The luminous regions 31 and 33 therefore serve as different phosphor regions R, G, B for the laser radiation of the first (blue-violet) laser 5. For the irradiation of the complete concentric ring formed by the luminous regions 31 to 33, therefore, the first (blue-violet) laser 5 is operated in continuous-wave operation.

Figure 6A:
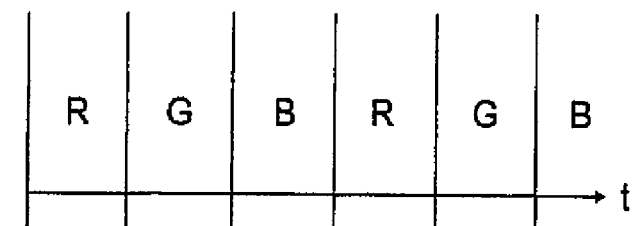
FIG. 6a shows the temporal profile of the phosphor segments of the phosphor wheel of the lighting device from FIG. 1.
Figure 6B:
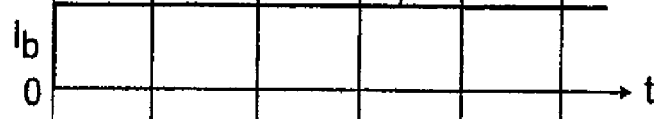
FIG. 6b shows the temporal profile of the blue laser radiation of the lighting device from FIG. 1.
Figure 6C:
FIG. 6c shows the temporal profile of the red laser radiation of the lighting device from FIG. 1.

By contrast, the second (red) laser 6 is preferably operated in a clocked fashion, to be precise in such a way that it emits only red laser radiation r, while the luminous region 31, i.e. the phosphor layer R comprising the red phosphor, rotates past below the laser radiation spot L(r, b). For this purpose, it is advantageous to correspondingly synchronize the driving of the red laser 6 with the phosphor wheel (not illustrated, for the sake of clarity). In other words, the phosphor layer R is irradiated at the same time (simultaneously) both by the first laser 5 with blue-violet laser radiation b and by the second laser 6 with red laser radiation r, i.e. the red laser radiation beam spot covers the blue laser radiation beam spot during the red phosphor segment R to form the common laser beam spot L(r, b). While the blue-violet laser radiation b is converted into red light by the red phosphor, the red laser radiation r is scattered by the red phosphor with only low absorption losses. As a result of the simultaneous combination of red laser radiation scattered in an unconverted fashion and wavelength-converted red light, a higher luminous flux is thus achieved for the red color channel. The temporal synchronization between phosphor wheel 2 and blue-violet laser radiation b and also red laser radiation r is illustrated schematically in FIGS. 6a-c. FIG. 6a illustrates the temporal succession of the phosphor segments R (red phosphor), G (green phosphor) and B (blue phosphor) of the phosphor wheel 2 which rotate through below the laser beam spot L. FIG. 6b shows, beginning with a point in time corresponding to the beginning of the red phosphor segment R in the example shown, the continuous-wave power $I_b$ of the blue-violet laser radiation b with a temporally constant value of greater than zero. Finally FIG. 6c shows the temporal profile of the clocked red laser radiation r, the laser power $I_b$ of which is greater than zero only in the phases in which the red phosphor segment R rotates through below the laser beam spot L. The method for operating the lighting device 1 illustrated in FIG. 1 can therefore be summarized with reference to FIGS. 6a-c as follows:

rotating the phosphor wheel 2, operating the blue-violet laser 5 in continuous-wave operation, irradiating the phosphor wheel 2 with the blue-violet laser radiation b of the blue-violet laser 5 such that the blue-violet laser radiation b forms a laser beam spot L on the phosphor wheel 2 rotating through, as a result of which the phosphor segments R, G, B are successively repeatedly irradiated by the blue-violet laser radiation b, operating the red laser 6 in clocked operation, irradiating the phosphor wheel 2 with the red laser radiation r of the red laser 6 such that, during the switch-on phases of the red laser 6, the red laser radiation r forms a laser beam spot L on the phosphor wheel 2 rotating through at the same location as the blue-violet laser radiation b, synchronizing the switch-on phases of the red laser 6 with the phosphor wheel 2 such that the red laser radiation r irradiates the red phosphor segment R.

What is achieved by the irradiation of the phosphor wheel 2 both with the blue-violet laser radiation b and with the red laser radiation r at the same location L, firstly, and the temporal synchronization of the switch-on phases of the red laser 6 with the red phosphor segment R rotating through, secondly, is that the phosphor conversion of the incident blue-violet laser radiation b (that is to say the generation of broadband red light) and the unconverted scattering of the incident red (narrow band) laser radiation r are carried out simultaneously by means of the red phosphor segment R.

The synchronization of the switch-on phases of the red laser with the red phosphor segment R rotating through is omitted if the red laser 6 alternatively—like the blue-violet laser 5—is also operated in continuous-wave operation. However, clocked operation is generally preferable for reasons of energy efficiency for the red laser 6. What is crucial at any rate is that at least a temporal overlap of the converted (broadband) red light and the unconverted (narrow band) red laser radiation is achieved.

The method explained above functions, in principle, analogously also with other light colors, in particular also with the combination of green phosphor conversion and green laser radiation and also blue phosphor conversion and blue laser radiation.

A reflector 8 here in the form of an elliptical half-shell reflector is disposed optically downstream of the phosphor wheel 2. The reflector 8 covers a part of the irradiated side of the phosphor wheel 2, including the region irradiated by the two lasers 5 and 6, or the laser radiation spot L, and is thus positioned in the upper half-space OH. There is an opening 4 in the reflector 8, through which opening the laser radiation of the two lasers 5 and 6 can enter the interior of the reflector 8 and irradiate the luminous regions 31 to 33 there. The phosphor wheel 2 is arranged partly outside the reflector 8, which facilitates a positioning of a drive motor for the rotation axis W and a cooling of the phosphor wheel 2.

A focal point F of the reflector 8 is situated in or near the light emission area or laser radiation spot L generated by the laser radiation of the two lasers 5 and 6 on the phosphor wheel 2 or the luminous regions 31 to 33 thereof.

A filter wheel 9 is arranged at the second focal point F' of the reflector 8, which filter wheel blocks the non-converted blue laser radiation synchronously with the irradiation of the red and green phosphors and thus improves the color purity of the red and green color channels, respectively. Arranged directly downstream of the filter wheel 9 or the second focal point F' of the reflector 8 is an optical integrator 10, for example a conical TIR optical element (TIR=Total Internal Reflection), which collects the abovementioned color portions of the useful light and forwards them for further use, for example—as mentioned in the introduction—for the image generating unit of a video projector.

The light emitted by the reflector 8 via the optical integrator 10 (including the red laser radiation backscattered without being converted by the red phosphor) is perceived as a mixed light having red, green and blue color portions given a light sequence implemented sufficiently rapidly, e.g. given a rotation of the phosphor wheel 2 of at least 25 revolutions per second.

Alternatively (not illustrated), the blue phosphor can be dispensed with if a laser that emits blue laser radiation is used for the first laser (instead of blue-violet laser radiation or UV laser radiation). The blue laser radiation can then be used directly for the blue portion of the useful light of the lighting device. For this purpose, the luminous region comprises a material which is applied on a reflective base and which scatters blue light, said material scattering the blue laser radiation of the first laser into the upper half-space OH without wavelength conversion. With regard to the functioning of the green and red phosphors, the explanations already given above hold true here as well.

In a variant that is not illustrated, the two lasers are embodied as a laser diode matrix. The laser diode matrix consists of 4 times 5 laser diodes each having a laser beam power of 1 watt. Of the total of 20 laser diodes, 16 are embodied as laser diodes which emit blue laser radiation and four are embodied as laser diodes which emit red laser radiation. With the use of a blue phosphor, blue-violet laser diodes having an emission wavelength of approximately 405 nm are appropriate; in the case of the variant without a blue phosphor, laser diodes having an emission wavelength of approximately 460 nm are suitable. Laser diodes having an emission wavelength of approximately 638 nm are suitable as red laser diodes. The red and blue laser diodes can be arranged either in a mixed fashion or in a spatially grouped fashion, i.e. in the form of an areal color pattern, for example inner red and outer blue laser diodes, or vice versa. Preferably, the laser radiation of the laser diode matrix is specularly reflected by 90° with respect to the optical axis of the laser diode matrix with the aid of a so-called TIR stepped mirror and in this case the area distribution of the 20 laser beams is compressed in one or two mutually perpendicular axes and subsequently focused onto the phosphor wheel with the aid of a focal lens. The compression enables the use of a focal lens having a smaller diameter than without compression.

The following phosphors are appropriate, for example:
Red phosphor (R): $CaAlSiN_3$:Eu,
Green phosphor (G): YAG:Ce($Y_{0.96}Ce_{0.04}$)$_3$ $Al_{3.75}Ga_{1.25}O_{12}$,
Blue phosphor (B): $BaMgAl_{10}O_{17}$:$Eu^{2+}$.

Furthermore, numerous further suitable phosphors can be used for the invention. Depending on the application, phosphors having a conversion spectrum comparable to those shown, that is to say red, green and blue, are appropriate or alternatively those having a different conversion spectrum.

Figure 3:
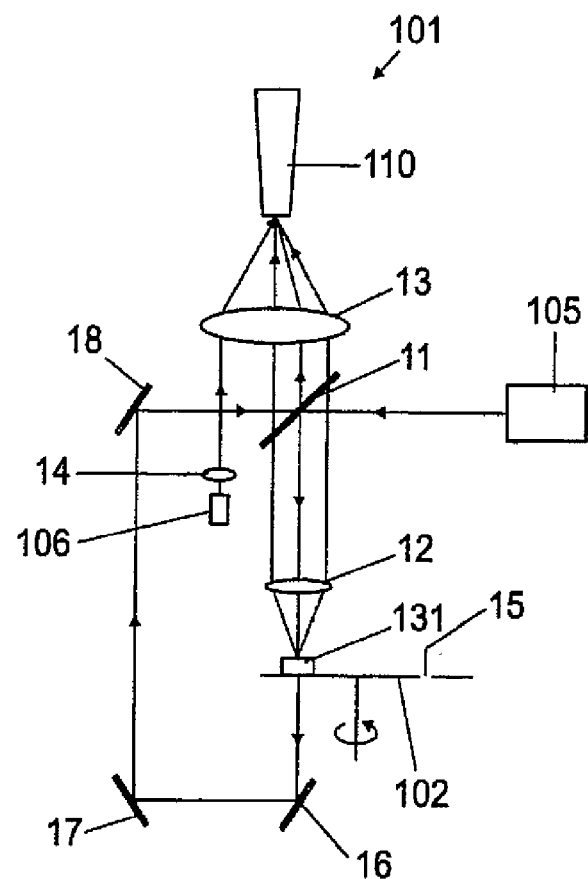
FIG. 3 shows a lighting device in accordance with a second embodiment comprising a rotatable phosphor wheel.

FIG. 3 shows in a schematic illustration a further lighting device 101 according to the invention comprising the colored light channels red, green and blue. In contrast to the lighting device 1, here the unconverted red laser radiation is fed in a separate beam path for the superimposition with the converted red light. Here, therefore, the phosphor regions 131 of the phosphor wheel 102 are irradiated only with the blue laser radiation of a first laser 105 in order thus to generate red and green converted light. For this purpose, the phosphor wheel 102 has a sector comprising a red phosphor and a sector comprising a green phosphor. A dichroic mirror 11 that reflects blue light directs the blue laser radiation onto the phosphor wheel 102. Depending on which of the two phosphor sectors it is currently rotating past below the blue laser radiation spot, the converted red or green light backscattered from the red or green phosphor, respectively, is collected by a collimator lens 12 and directed through the dichroic mirror 11, which is transparent to red or green light, via a converging lens 13 onto an optical integrator 110, for example a conical TIR rod. For the blue color channel, the phosphor wheel 102 has a sector having a slot 15 besides the red and green phosphor sectors. Whenever this slot sector 15 moves through the blue laser beam coming from one side of the dichroic mirror 11, the blue laser beam can pass through the slot and is reflected back via three deflection mirrors 16-18 onto the other side of the dichroic mirror 11. The dichroic mirror 11 finally concentrates the blue laser radiation via the converging lens 13 onto the input aperture of the optical integrator 110. In addition, in a separate beam path, red laser radiation of a red laser diode 106 is imaged via a collimator lens 14 and the collimator lens 13 onto the input aperture of the optical integrator 110 and is simultaneously superimposed there with the red converted light. In this way, the luminous flux is increased in conjunction with high luminance for the red colored light channel. For the simultaneous superimposition, the blue laser 105 is operated in continuous-wave operation. By contrast, the second red laser 106 is operated in a clocked fashion, to be precise in such a way that it emits only laser radiation, while the luminous region 31, i.e., the phosphor layer R comprising the red phosphor, rotates past below the laser radiation spot L, that is to say ultimately in the phase in which red converted light is also generated and directed into the optical integrator 110. In this respect, the temporal control and synchronization of the method for operating the lighting device 101 corresponds to the already explained method for operating the lighting device 1 (see FIGS. 1 and 6).

Figure 4:
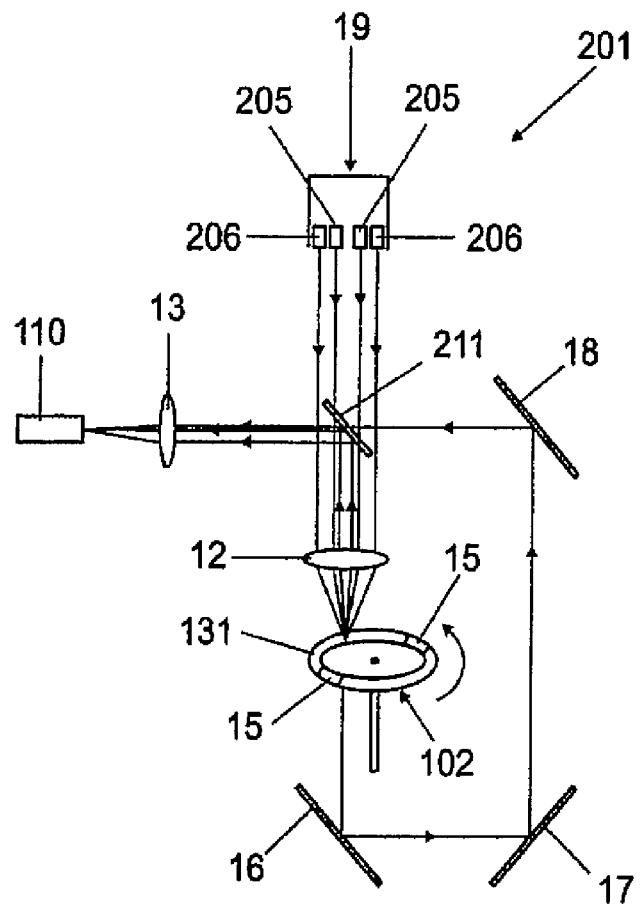
FIG. 4 shows a variant of the lighting device shown in FIG. 3.

FIG. 4 shows in a schematic illustration a further lighting device 201 according to the invention, which is a variant of the lighting device 101 shown in FIG. 3. Here the red and blue laser radiation is generated with the aid of a common laser diode matrix 19. For this purpose, the laser diode matrix 19 has four times four blue laser diodes 205 and also four red laser diodes 206. The four red laser diodes 206 are arranged outside the 16 blue laser diodes 205 spanning a square field such that the red laser radiation can pass a dichroic mirror 211, which reflects red light, on the outside without being impeded. The red laser radiation thus passes via the lens 12 onto the phosphor wheel 102, wherein the red laser diodes 206 are driven in a clocked fashion such that the red laser radiation impinges only on the red phosphor of the phosphor region 131 and is almost completely backscattered from there with only very little absorption. The backscattered red laser radiation is concentrated by the lens 12 onto the dichroic mirror 211, which reflects red light and which directs the red laser radiation via the converging lens 13 into the optical integrator 110. By contrast, the blue laser radiation from the blue laser diodes 205 passes through the dichroic mirror 211 and is concentrated by the lens 12 onto the phosphor wheel 102. In the course of a complete rotation of the phosphor wheel 102, the blue laser radiation impinges on the red phosphor and is converted to red light, the green phosphor and is converted to green light, or the slot sector and passes through the phosphor wheel 102 without conversion. The blue laser radiation passing through the phosphor wheel 102 through the slot 15 is directed via three deflection mirrors through the dichroic mirror 211, which reflects red light, and via the converging lens 13 into the optical integrator 110. The two colored light portions red and green that are backscattered by phosphor conversion by the corresponding phosphors of the phosphor wheel are concentrated by the lens 12 onto the dichroic mirror 211 and directed from there via the converging lens 13 into the optical integrator 110. In order that the red light converted by the red phosphor and the red unconverted laser radiation are superimposed simultaneously in the optical integrator 110, the red laser diodes 206 are operated in a clocked fashion such that the red laser radiation simultaneously with the blue laser radiation impinge on the same red phosphor and are backscattered there in a converted and an unconverted fashion, respectively. For the red colored light channel, red light having a higher luminous flux in conjunction with high luminance is achieved at the output of the optical integrator in this way. If there is a need for a further colored light channel, the phosphor wheel 102 can be provided with a further sector-type phosphor region, for example with a yellow phosphor for an additional yellow colored light channel.

Figure 5:
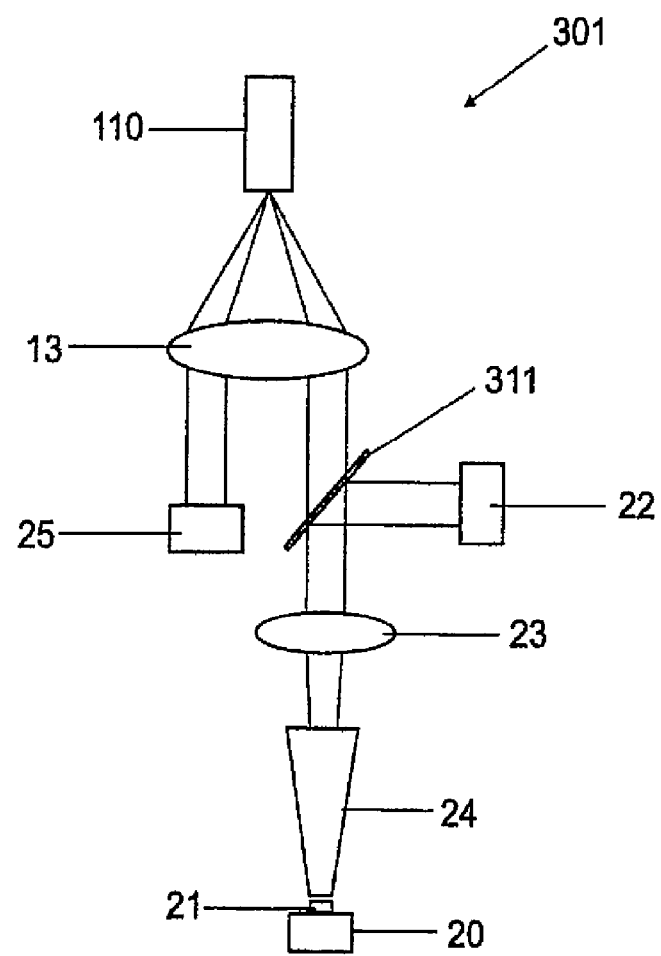
FIG. 5 shows a lighting device in accordance with a further embodiment comprising a static phosphor arrangement.

FIG. 5 shows a further lighting device 301 according to the invention in a schematic illustration. This involves a static phosphor arrangement, i.e. without a phosphor wheel. Rather, the phosphors for the different colored light channels are arranged on a solid heat sink 20 as carrier in the form of a square phosphor layer 21 having three juxtaposed strip-shaped sections (not depicted by it) one each for the red, green and blue phosphors. A first laser matrix 22 comprising 16 ultraviolet (UV) laser diodes (not illustrated) supplies UV laser radiation which impinges on the phosphor layer 21 via a dichroic mirror 311, which reflects UV radiation, a lens 23 and a TIR optical element 24. The TIR optical element 24 serves, firstly, to spatially homogenize the UV laser radiation by means of multiple internal reflection and thereby to uniformly irradiate the phosphor layer 21 with the three strip-shaped phosphors. Secondly, it serves to collect the portion of the UV laser radiation that is backscattered or diffusely reflected and wavelength-converted by the phosphors. For this purpose, the TIR optical element 24 substantially consists of a conical quartz glass rod having a round cross section. The converted colored light portions red, green and blue collected by the TIR optical element 24 are concentrated by the lens 23, pass through the dichroic mirror 311 and are fed into an optical integrator 110 by a converging lens 13. In parallel with this beam path of the converted colored light portions red, green, blue, red laser radiation, generated by four red laser diodes of a red laser diode matrix 25, is fed via the converging lens 13 into the optical integrator 110. The red laser matrix and the UV laser matrix can both be operated in continuous-wave operation or in a clocked fashion, in the latter case in a synchronously clocked fashion, however, in order that the red light converted by the red phosphor is simultaneously superimposed with the unconverted red laser radiation in the optical integrator 110. For the red colored light channel, red light having a high luminance and a higher luminous flux than without simultaneous superimposition is achieved at the output of the optical integrator in this way.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

What is claimed is:

1. A lighting device comprising:
   a light emitting device capable of emitting light of a first light color continuously and capable of emitting light of a second light color in a clocked fashion;
   a phosphor wheel rotatable about a rotation axis, the phosphor wheel having two phosphor regions on adjacent ring segments of a ring concentric with the rotation axis, a first phosphor region capable of converting the first light color by more than 95% into green light, and a second phosphor region capable of converting the first light color by more than 95% into red light, the phosphor wheel having a slot passing through the ring;
   a first optical element positioned in the path of the light of the first color emitted from the light emitting device between the light emitting device and the phosphor wheel configured so that the light of the first light color passes through the first optical element and the light of the second light color bypasses the first optical element;

a second optical element positioned in the path of the light of the first color and second color emitted from the light emitting device between the first optical element and the phosphor wheel, the second optical element directing at least a portion of the light of the first color and second color into a focal spot on a plane comprising the ring of phosphor regions of the phosphor wheel;

a third optical element transmitting light emitted by the second optical element and passing through the slot in the ring of the phosphor wheel; and a fourth optical element collecting or combining light and emitting the collected or combined light, wherein the phosphor wheel is configured to rotate so that, when the light emitting device emits light of only the first light color, the slot in the phosphor wheel is positioned at the focal spot on the ring of the phosphor wheel to permit the light of the first light color to pass through the slot in the phosphor wheel to the third optical element, wherein the third optical element is configured so that the light of the first light color that passes through the slot in phosphor wheel is directed by the third optical element to the first optical element, wherein the first optical element is configured so that the light of the first light color that passes through the slot in phosphor wheel and is directed by the third optical element to the first optical element passes through the first optical element to the fourth optical element, and wherein first optical element is configured so that the light of the second light color emitted by the phosphor wheel is directed to the fourth optical element by the first optical element.

2. The lighting device of claim 1, wherein the second light color is red light.

3. The lighting device of claim 2, wherein the first light color is one of blue, blue-violet, and ultraviolet light.

4. The lighting device of claim 1, wherein the first optical element is a dichroic mirror.

5. The lighting device of claim 4, wherein the third optical element comprises a plurality of mirrors.

6. The lighting device of claim 1, wherein the second optical element is a collimator lens.

7. The lighting device of claim 1, wherein the fourth optical element is a converging lens.

8. The lighting device of claim 1,
wherein the first optical element is a dichroic mirror,
wherein the third optical element comprises a plurality of mirrors,
wherein the second optical element is a collimator lens, and
wherein the fourth optical element is a converging lens.

9. The lighting device of claim 1, wherein the phosphor wheel is configured to rotate so that, when the light emitting device simultaneously emits light of the first light color and the second light color, the second phosphor region of the phosphor wheel is positioned at the focal spot on the ring of the phosphor wheel.

10. The lighting device of claim 8, wherein the phosphor wheel is configured to rotate so that, when the light emitting device simultaneously emits light of the first light color and the second light color, the second phosphor region of the phosphor wheel is positioned at the focal spot on the ring of the phosphor wheel.

* * * * *